(12) United States Patent
Rohrmann et al.

(10) Patent No.: US 11,655,852 B2
(45) Date of Patent: May 23, 2023

(54) SLIDING BEARING HAVING SLIDING SEGMENTS

(71) Applicant: RENK GMBH, Augsburg (DE)

(72) Inventors: Thorsten Rohrmann, Binder (DE); Alexander Unger, Hannover (DE); Peter Decker, Hannover (DE)

(73) Assignee: RENK GMBH, Augsburg (DE)

( * ) Notice: Subject to any disclaimer, the term of this patent is extended or adjusted under 35 U.S.C. 154(b) by 0 days.

(21) Appl. No.: 17/552,416

(22) Filed: Dec. 16, 2021

(65) Prior Publication Data
US 2022/0196069 A1 Jun. 23, 2022

(30) Foreign Application Priority Data
Dec. 17, 2020 (DE) .......................... 102020133940.2

(51) Int. Cl.
*F16C 33/10* (2006.01)
*F16C 23/02* (2006.01)
(Continued)

(52) U.S. Cl.
CPC .......... *F16C 33/1065* (2013.01); *F16C 17/10* (2013.01); *F16C 23/02* (2013.01); *F16C 33/046* (2013.01)

(58) Field of Classification Search
CPC ...... F16C 17/08; F16C 33/1065; F16C 17/10; F16C 23/02
See application file for complete search history.

(56) References Cited

U.S. PATENT DOCUMENTS

| | | | |
|---|---|---|---|
| 2003/0179966 A1* | 9/2003 | Hojo | F16C 33/046 384/288 |
| 2005/0129341 A1* | 6/2005 | Hoppe | F04B 1/2071 384/462 |

(Continued)

FOREIGN PATENT DOCUMENTS

| | | |
|---|---|---|
| DE | 2409711 C2 | 8/1983 |
| DE | 69926046 T2 | 4/2006 |
| DE | 102013211710 C5 | 11/2016 |

*Primary Examiner* — Long T Tran
(74) *Attorney, Agent, or Firm* — Perry + Currier, Inc.

(57) ABSTRACT

The invention relates to a sliding bearing having a first bearing component and a second bearing component, which are arranged such that they can rotate relative to each other in a rotation direction (RR) about a rotation axis (RA), wherein at least two sliding segments (1) are arranged between the first bearing component and the second bearing component,
wherein the at least two sliding segments (1) each have a support structure (2) for fixing the sliding segment (1) to the first or second bearing component, and a sliding surface (3) for bringing the sliding segment (1) into sliding contact with the second or first bearing component,
wherein the sliding surface (3) has, in the rotation direction (RR), a front leading edge (4) and a rear trailing edge (5),
wherein the sliding surface (3) has an oil distribution groove (6), which is arranged directly adjacent to the front leading edge (4), and
wherein the sliding segment (1) has a passage opening (7) for supplying the oil distribution groove (6) with oil, which preferably extends from a radial outer surface (21) of the support structure (2) to the oil distribution groove (6) or to the sliding surface (3).

15 Claims, 4 Drawing Sheets

Figure 1:
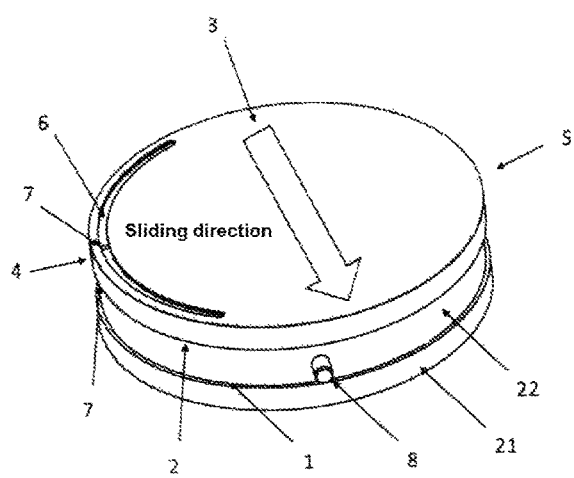

(51) Int. Cl.
*F16C 17/10* (2006.01)
*F16C 33/04* (2006.01)

(56) References Cited

U.S. PATENT DOCUMENTS

| | | | |
|---|---|---|---|
| 2008/0056632 A1* | 3/2008 | Yoshimura | F01C 21/02 384/400 |
| 2009/0304316 A1* | 12/2009 | Hattori | F16C 33/1085 384/368 |
| 2010/0046869 A1* | 2/2010 | Matsuyama | F16C 33/046 123/198 R |
| 2014/0345141 A1 | 11/2014 | Gonzalez et al. | |
| 2015/0043849 A1 | 2/2015 | Peterson et al. | |
| 2015/0176647 A1* | 6/2015 | Lee | F16C 33/6659 384/473 |
| 2018/0142728 A1* | 5/2018 | Morita | F16C 17/022 |
| 2020/0232507 A1* | 7/2020 | Iwaki | F16C 17/10 |
| 2020/0291998 A1* | 9/2020 | Shin | F16H 57/043 |

\* cited by examiner

SLIDING BEARING HAVING SLIDING SEGMENTS

The invention relates to a sliding bearing having a first bearing component and a second bearing component, which are arranged such that they can rotate relative to each other in a rotation direction about a rotation axis, in which at least two sliding segments are arranged between the first bearing component and the second bearing component.

Slide-active elements, which are supplied with lubricant from the rear via a circumferential gap, are typically used in thrust bearings. This supply of lubricant can vary over the area of the segment, which is usually round in shape, and cannot be precisely calculated or even adjusted because the geometry of the gap is influenced by various factors such as manufacturing tolerances, the operating state or the net weight of the segments. In the case of typical oil supply, this results in considerable oil wastage because a large volume of the oil flows down the sides of the segments without any technical usefulness.

In particular due to the design-related inclination of the power train of a wind turbine, which is typically 5°-6° from the horizontal, it is furthermore not guaranteed that the oil will reach the thrust collar, i.e., the sliding surface would not be covered at all. The consequences of this are inadequate lubrication and increased wear.

Hydrostatic lift is usually brought about via a pocket or an annular groove. This annular groove has a diameter of roughly 50%-60% of the segment diameter. A larger diameter would negatively impact the hydrodynamic pressure distribution and thus limit the bearing capacity of the segment. With these dimensions, the necessary lifting pressures of the hydrostatic mechanism increase to over 200 bar, which is something to be avoided.

The problem addressed by this invention is therefore that of providing sliding bearings having sliding segments arranged between a first bearing component and a second bearing component, in which the lubrication between the bearing components and the sliding segments is optimized.

This problem is solved by the combination of features according to Claim 1.

A sliding bearing having a first bearing component and a second bearing component, which are arranged such that they can rotate relative to each other in a rotation direction about a rotation axis, is proposed according to the invention. At least two sliding segments are arranged between the first bearing component and the second bearing component. The at least two sliding segments each have a support structure for fixing the sliding segment to the first or second bearing component, and a sliding surface for bringing the sliding segment into sliding contact with the second or first bearing component. The sliding surface furthermore has, in the rotation direction, a front leading edge and a rear trailing edge and comprises an oil distribution groove, which is arranged directly adjacent to the front leading edge. The sliding segment also has a passage opening for supplying oil to the oil distribution groove, which preferably extends from a radial outer surface of the support structure to the oil distribution groove or to the sliding surface.

The advantage of this is that a lubricated operation of the sliding bearing is ensured and optimized by supplying the slide-active element directly with lubricant of the sliding bearing. The quantity of lubricant supplied is decisive for the service life of the slide-active element. This quantity can be precisely defined, determined, influenced and increased by the implementation of direct supplying. The sliding surface is supplied through the segment directly to the place needed, in particular the sliding surface of the sliding segment. The lubricant is fed directly to the segment and can be reduced by the volumetric flow rate to the actual need at the lubrication gap. Oil can thus be supplied in a targeted manner, even at low circumferential speed and geometrically unfavorable arrangements such as an "upside down" arrangement, for example. In addition, each single segment can be supplied individually with oil. By dispensing with the otherwise needed feeding ring, the slide-active segments can be made larger such that a higher bearing capacity of the bearing is achievable. In another advantageous embodiment, the passage opening for supplying the oil distribution groove with oil can also be connected directly or indirectly to a high-pressure oil supply for achieving hydrostatic lift.

In an advantageous embodiment variant, provision is made such that the sliding surface of the sliding segment is essentially round. This is advantageous for the lubricant distribution and the arrangement or formation of the oil distribution groove on the front leading edge.

The sliding bearing is preferably configured in such a way that the oil distribution groove of the sliding surface is arcuate, wherein the oil distribution groove preferably spans an angle of 90° to 180°. Due to the arcuate shape of the oil distribution groove, the latter is ideally adapted to the leading edge, thereby improving the lubrication of the sliding surface or of the sliding segment. Furthermore, a crescent-shaped oil distribution groove, the diameter of which is greater in a middle region than at both ends of the oil distribution groove, is advantageous in terms of different application cases of the sliding bearing.

In an exemplary embodiment of the invention, provision is made such that the sliding surface has another oil distribution groove, which is arranged directly adjacent to the rear trailing edge. The distribution of lubricant on the sliding surface of the sliding segment is thus further improved.

Also advantageous is an embodiment in which the other oil distribution groove of the sliding surface is arcuate, wherein the other oil distribution groove preferably spans an angle of 90° to 180°. In a manner analogous to the oil distribution groove, the arcuate other oil distribution groove optimizes the lubrication of the sliding surface or sliding segment. Furthermore, a crescent-shaped oil distribution groove is likewise possible.

In another advantageous variant, provision is inventively made such that a groove gap is formed on the edge of the sliding surface between the oil distribution groove and the other oil distribution groove in each case. Due to the interrupted groove, two, three or four circular segment-shaped grooves are formed, for example, according to the number of grooves. As a result, bearing pressure is distributed between the grooves to the segment middle, leading to a hydrostatic lift. The bearing pressure loss is thus negligible in comparison to a closed annular hydrostatic groove.

In an embodiment variant, the sliding bearing according to the invention is configured such that the oil distribution groove and the other oil distribution groove are connected by means of an oil circuit. It is thus advantageous that an integrated hydrostatic lift is implemented when both grooves are supplied with high-pressure oil.

In an alternative embodiment of this sliding bearing, provision is also made such that the oil distribution groove of the sliding surface is formed completely along the entire edge of the sliding surface. This ensures that the entire sliding surface of the sliding segment is well supplied with lubricant.

In another alternative embodiment of the invention, the oil distribution groove of the sliding surface is formed by a multiplicity of recesses, preferably by a multiplicity of drilled holes. The recesses of the oil distribution groove are arranged arcuately and preferably arranged spaced apart from one another in a row. It is thus advantageous that the lubricant can be applied to the sliding surface via the corresponding recess and that in this manner a lubricant distribution is uniform or can be adapted to the respective application cases by means of an arrangement or number of recesses.

In an advantageous exemplary embodiment, provision is made such that the recesses each have a passage opening for supplying the oil distribution groove with oil, which extends from a radial outer surface of the support structure to the oil distribution groove or sliding surface. The oil distribution groove or the sliding surface is thus supplied with the lubricant.

In another advantageous exemplary embodiment, provision is inventively made such that a channel for allowing an oil to flow around the support structure or for supplying the oil distribution groove with oil is formed on the radial outer surface of the support structure. The advantage of this is that the oil, which flows around the sliding segment, on the circumferential surface thereof, reaches the sliding surface via the recesses and can be distributed on the sliding surface of the sliding segment in accordance with the arrangement and number of recesses.

Another alternative embodiment of this sliding bearing makes provision such that the sliding surface is rectangular or square and the oil distribution groove of the sliding surface is rectilinear. A sliding bearing configured in this manner or an oil distribution groove configured in this manner improves the lubrication between the bearing components and the sliding segments in certain application cases.

In a preferred embodiment of the invention, a rotation lock, in particular a bolt-shaped rotation lock, is formed on an outer surface of the support structure. In this manner, a rotation of the sliding segment during operation is blocked with a correspondingly configured counterpart of the sliding bearing.

In an embodiment variant, the sliding bearing according to the invention is configured as a thrust bearing, in particular a thrust bearing for a power train of a wind turbine.

Figure 2:
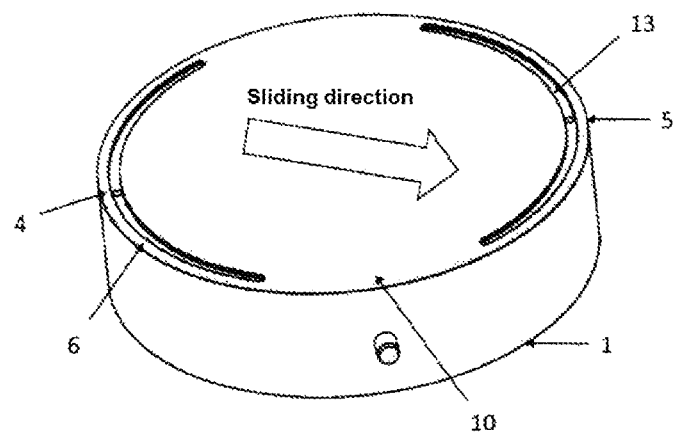
Figure 3:
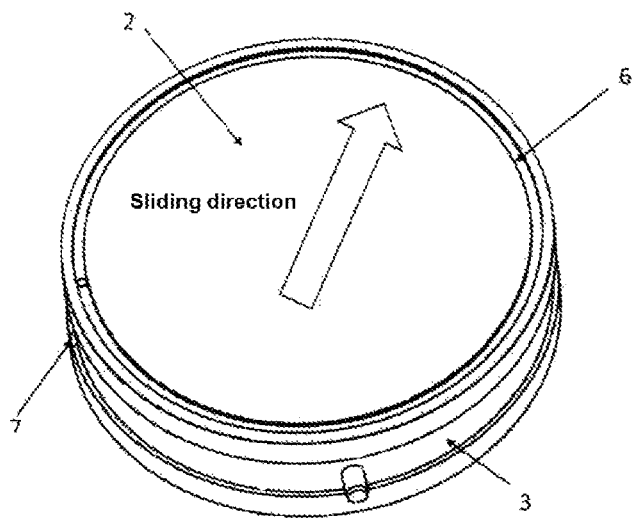
Figure 4:
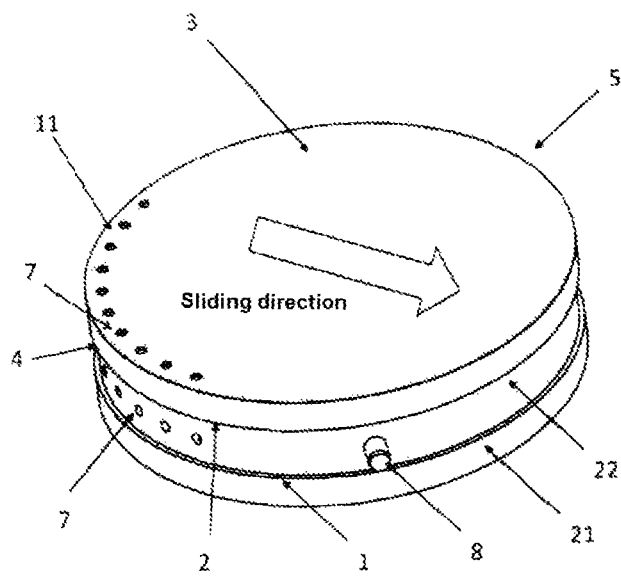

Other advantageous developments of the invention are characterized in the subordinate claims or presented in more detail below in conjunction with the description of the preferred embodiment of the invention, with reference to the figures. Shown are:

FIG. 1 a perspective view of a sliding segment of a sliding bearing having an arcuate oil distribution groove, FIG. 2 a perspective view of a sliding segment of a sliding bearing having two arcuate oil distribution grooves, FIG. 3 a perspective view of a sliding segment of a sliding bearing having an annular oil distribution groove and FIG. 4 a perspective view of a sliding segment of a sliding bearing having an oil distribution groove formed by recesses.

A perspective view of a sliding segment 1 of a sliding bearing having an arcuate oil distribution groove 6 is illustrated in FIG. 1. The sliding bearing is configured as a thrust bearing for a power train of a wind turbine. The sliding bearing comprises a multiplicity of sliding segments 1 and the individual sliding segments 1 are arranged on a common partial circle and as a whole form the thrust bearing.

The sliding bearing comprises a first bearing component and a second bearing component, which are arranged such that they can rotate relative to each other, in a rotation direction, about a rotation axis. The multiplicity of sliding segments 1 is arranged between the first bearing component and the second bearing component.

The respective sliding segments 1 of the multiplicity of sliding segments 1 each have a support structure 2 for fixing the sliding segment 1 to the first or second bearing component, and a sliding surface 3 for bringing the sliding segment 1 into sliding contact with the second or first bearing component.

The sliding surface 3 of the sliding segment 1 is essentially round and has, in the rotation direction, a front leading edge 4 and a rear trailing edge 5.

The sliding surface 3 also has an oil distribution groove 6, which is arranged directly adjacent to the front leading edge 4. Furthermore, the oil distribution groove 6 of the sliding surface 3 is arcuate and spans an angle of approximately 90°.

The sliding segment 1 has a passage opening 7 for supplying the oil distribution groove 6 with oil, which extends from a radial outer surface 21 of the support structure 2 to the oil distribution groove 6 or to the sliding surface 3. In addition, a channel 22 for allowing an oil to flow around the support structure 2 or for supplying the oil distribution groove 6 with oil is formed on the radial outer surface 21 of the support structure 2. Furthermore, a bolt-shaped rotation lock 8 is formed on the radial outer surface 21 of the support structure 2.

Because the sliding segments in the following section of the description of the figures essentially have the same features, only the fundamental differences shall be addressed in the following.

FIG. 2 shows a perspective view of a sliding segment 1 of a sliding bearing having two arcuate oil distribution grooves 6, 13. The sliding surface 3 of the sliding segment 1 has another oil distribution groove 13, which is arranged directly adjacent to the rear trailing edge 5. The other oil distribution groove 13 of the sliding surface 3 is crescent-shaped and spans an angle of 90°.

In each case a groove gap 10 is formed on the edge of the sliding surface 3 between the oil distribution groove 6 and the other oil distribution groove 13. In addition, the oil distribution groove 6 and the other oil distribution groove 13 are connected by means of an oil circuit.

A perspective view of a sliding segment 1 of a sliding bearing having an annular oil distribution groove 6, which extends completely along the entire edge of the sliding surface 3, is illustrated in FIG. 3. The sliding segment 1 also comprises a passage opening 7 for supplying the oil distribution groove 6 with oil, which extends from a radial outer surface 21 of the support structure 2 to the oil distribution groove 6 or to the sliding surface 3.

Also, a perspective view of a sliding segment 1 of a sliding bearing having an oil distribution groove 6 formed by recesses 11 is illustrated in FIG. 4. The oil distribution groove 6 of the sliding surface 3 is formed by a multiplicity of recesses 11, in particular by a multiplicity of drilled holes. In addition, the recesses 11 of the oil distribution groove 6 are arranged arcuately and spaced apart from one another in a row.

Furthermore, the recesses 11 each have a passage opening 7 for supplying the oil distribution groove 6 with oil, which extends from a radial outer surface 21 of the support structure 2 to the oil distribution groove 6 or to the sliding surface 3.

In its embodiment, the invention is not limited to the preferred exemplary embodiment presented here. Instead, a number of variants are conceivable, which likewise make use of the illustrated solution in embodiments of a fundamentally different nature.

The invention claimed is:

1. A sliding bearing comprising:
a first bearing component and a second bearing component, which are arranged such that they rotate relative to each other in a rotation direction about a rotation axis,
wherein at least two sliding segments are arranged between the first bearing component and the second bearing component,
wherein the at least two sliding segments each have a support structure for fixing the sliding segment to the first or second bearing component, and a sliding surface for bringing the sliding segment into sliding contact with the second or first bearing component,
wherein the sliding surface has, in the rotation direction, a front leading edge and a rear trailing edge,
wherein the sliding surface has an oil distribution groove, which is arranged directly adjacent to the front leading edge, and
wherein the sliding segment has a passage opening for supplying the oil distribution groove with oil, which preferably extends from a radial outer surface of the support structure to the oil distribution groove or to the sliding surface.

2. The sliding bearing according to claim 1 wherein the sliding surface of the sliding segment is round.

3. The sliding bearing according to claim 1, wherein the oil distribution groove of the sliding surface is arcuate, wherein the oil distribution groove spans an angle of 90° to 180°.

4. The sliding bearing according to claim 1 wherein the sliding surface has another oil distribution groove, which is arranged directly adjacent to the rear trailing edge.

5. The sliding bearing according to claim 4, wherein the other oil distribution groove of the sliding surface is arcuate, wherein the other oil distribution groove spans an angle of 90° to 180°.

6. The sliding bearing according to claim 4, wherein a groove gap is formed between the oil distribution groove and the other oil distribution groove in each case on the edge of the sliding surface.

7. The sliding bearing according to claim 6, wherein the oil distribution groove and the other oil distribution groove are connected by means of an oil circuit.

8. The sliding bearing according to claim 1, wherein the oil distribution groove of the sliding surface is formed completely along the entire edge of the sliding surface.

9. The sliding bearing according to claim 1, wherein the oil distribution groove of the sliding surface is formed by a multiplicity of recesses, wherein the recesses of the oil distribution groove are arranged arcuately and are arranged spaced apart from one another in a row.

10. The sliding bearing according to claim 9, wherein the recesses each have a passage opening for supplying the oil distribution groove with oil, which extends from a radial outer surface of the support structure to the oil distribution groove or the sliding surface.

11. The sliding bearing according to claim 1, wherein a channel for allowing an oil to flow around the support structure, or for supplying the oil distribution groove with oil, is formed on the radial outer surface of the support structure.

12. The sliding bearing according to claim 1, wherein the sliding surface is rectangular or square and the oil distribution groove of the sliding surface is rectilinear.

13. The sliding bearing according to claim 1, wherein the sliding surface is annular or annulus segment-shaped and the oil distribution groove of the sliding surface is one or more of straight and arcuate.

14. The sliding bearing according to claim 1, wherein one or more of a rotation lock, and a bolt-shaped rotation lock, is formed on the radial outer surface of the support structure.

15. The sliding bearing according to claim 1, wherein the sliding bearing is configured as one or more of a thrust bearing, and a thrust bearing for a power train of a wind turbine.

* * * * *